Figure 1:
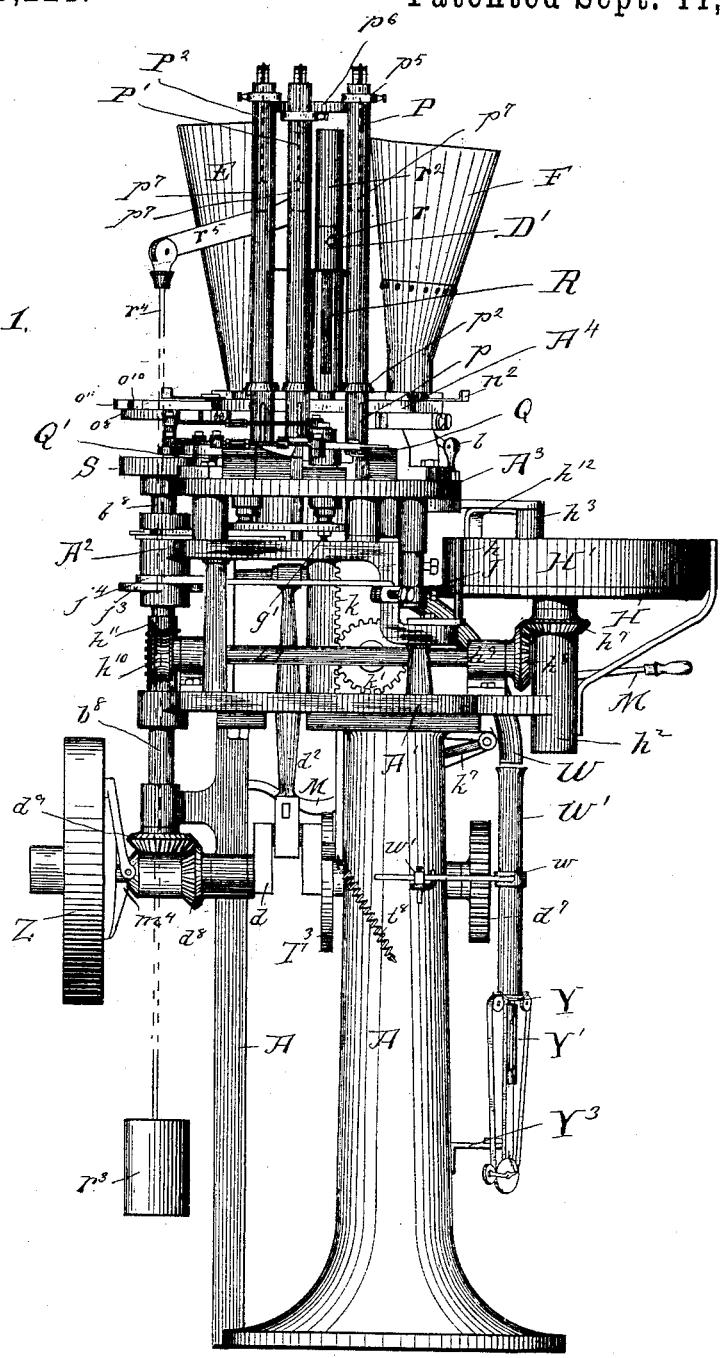

(No Model.)　　　　　　　　　　　　　　　　　　　9 Sheets—Sheet 1.
C. C. HILL.
CARTRIDGE LOADING MACHINE.
No. 389,221.　　　　　　　　　　Patented Sept. 11, 1888.

Witnesses:　　　　　　　　　　　　　　　　　Inventor:
Lew. C. Curtis.　　　　　　　　　　　　　Christian C. Hill
H. W. Munday　　　　　　　By Munday, Evarts & Adcock,
　　　　　　　　　　　　　　　　　　　his Attorneys.

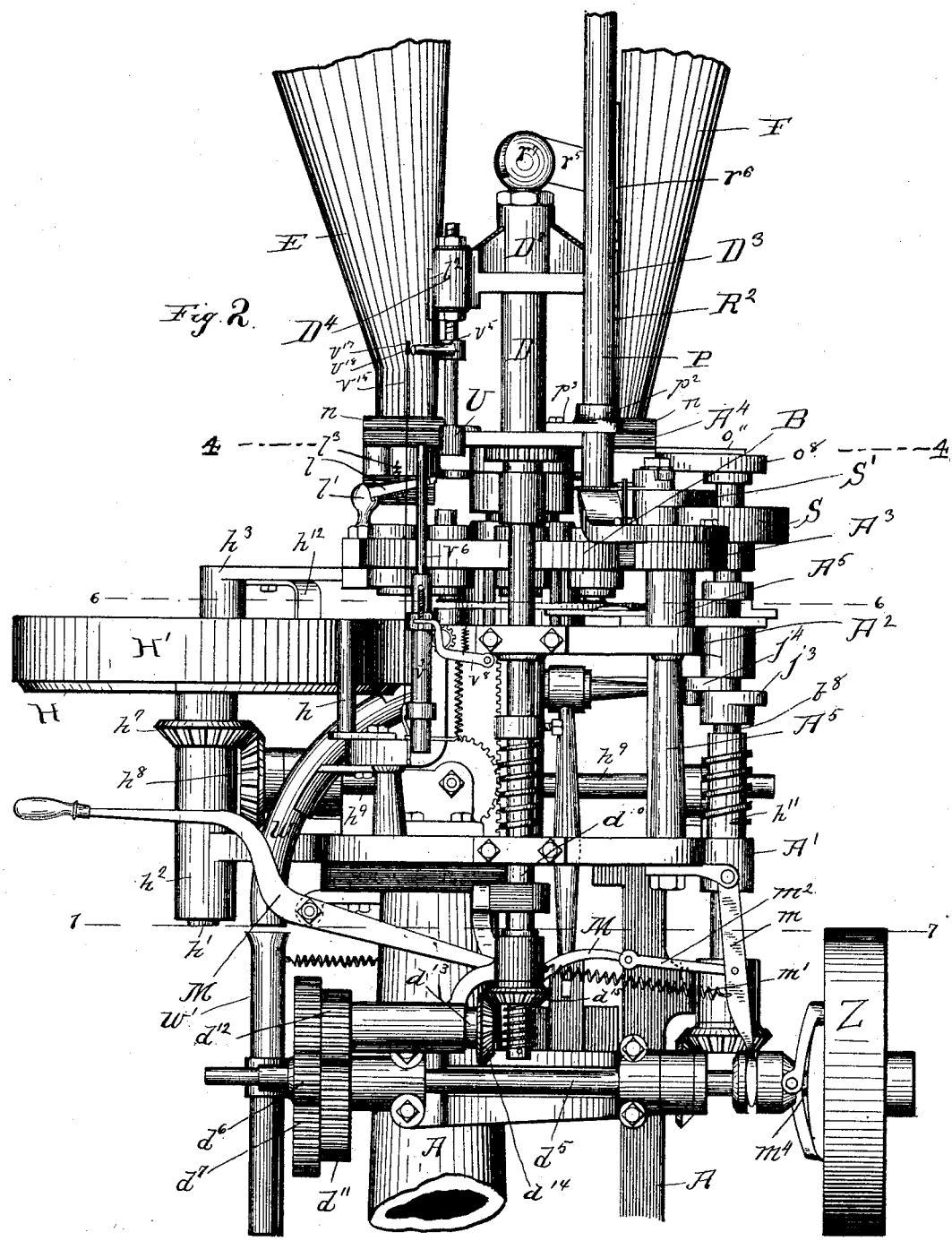

(No Model.)  9 Sheets—Sheet 3.
C. C. HILL.
CARTRIDGE LOADING MACHINE.
No. 389,221. Patented Sept. 11, 1888.
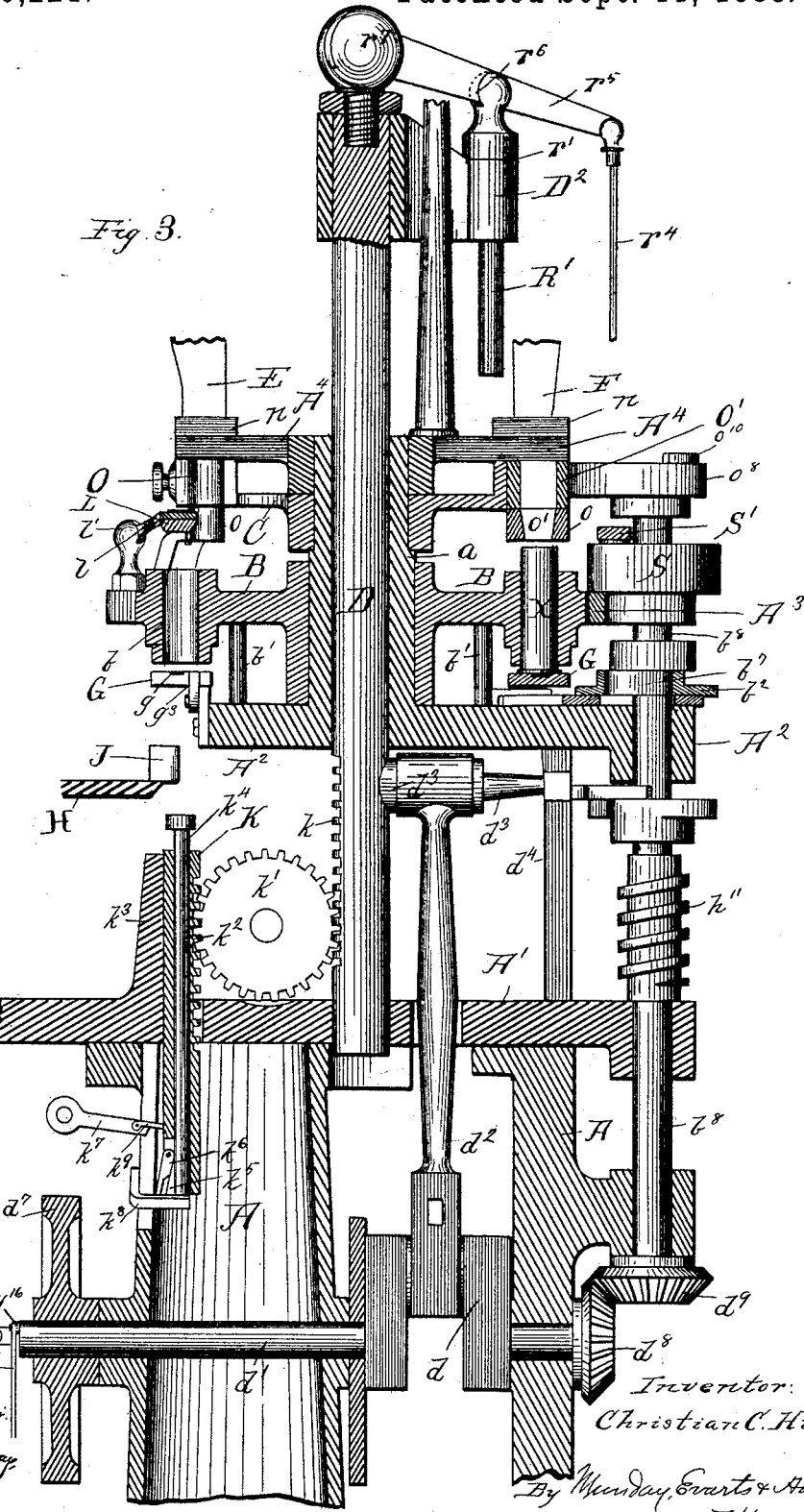

(No Model.) 9 Sheets—Sheet 4.
C. C. HILL.
CARTRIDGE LOADING MACHINE.
No. 389,221. Patented Sept. 11, 1888.
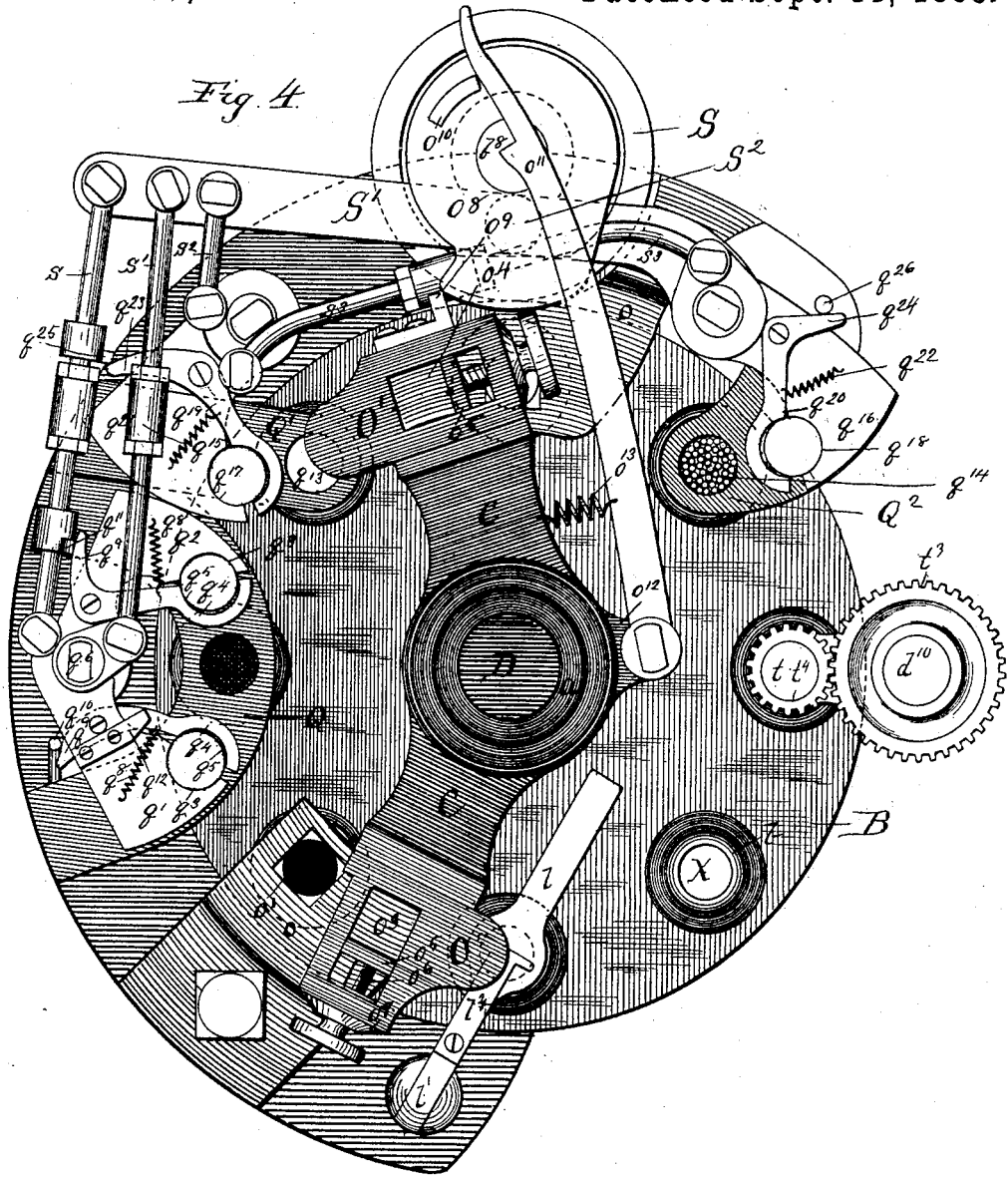
Witnesses.
Lew. E. Burtis.
H. W. Munday.
Inventor:
Christian C. Hill.
By Munday, Evarts & Adcock,
his Attorneys.

(No Model.) 9 Sheets—Sheet 5.
C. C. HILL.
CARTRIDGE LOADING MACHINE.
No. 389,221. Patented Sept. 11, 1888.
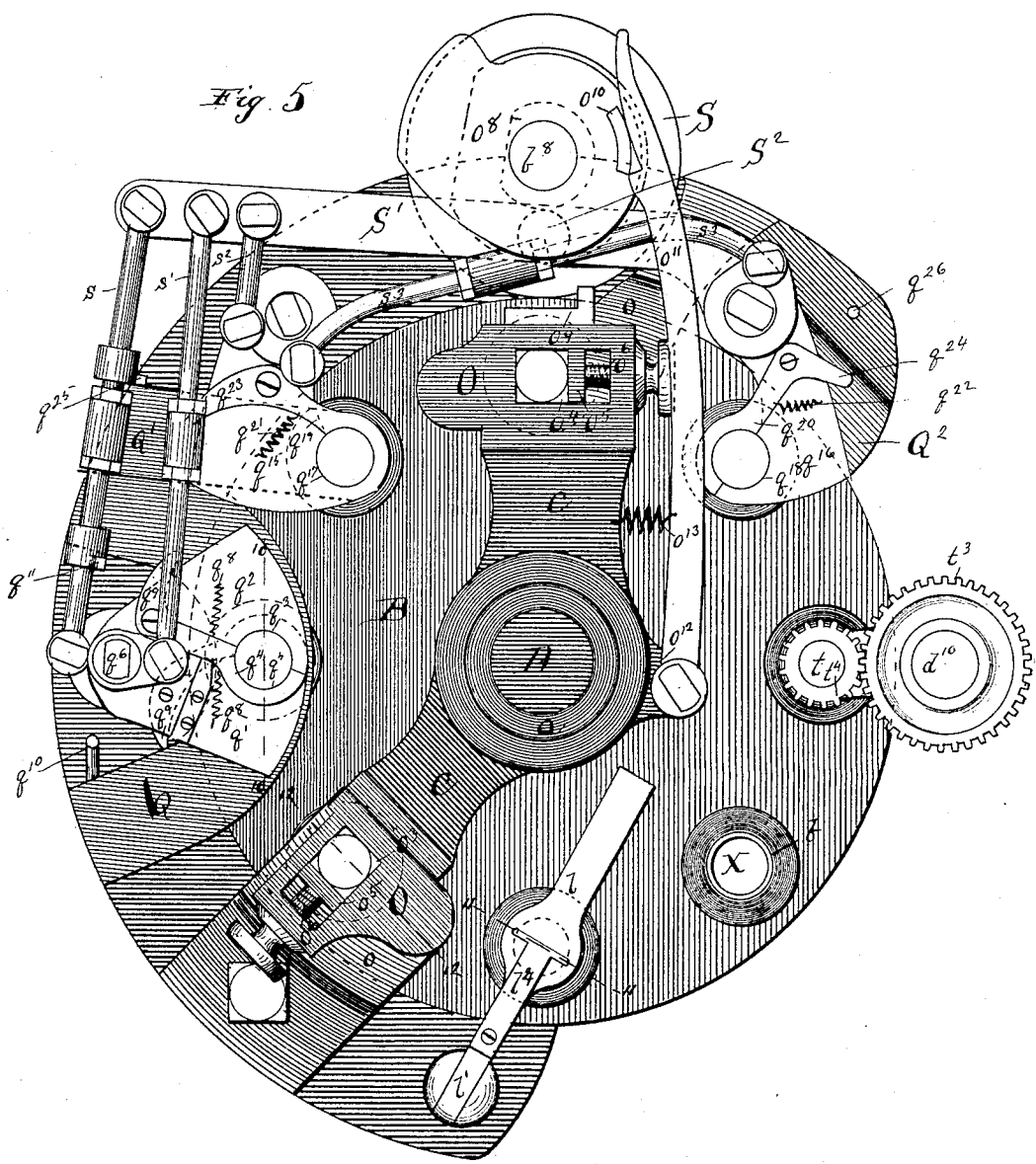

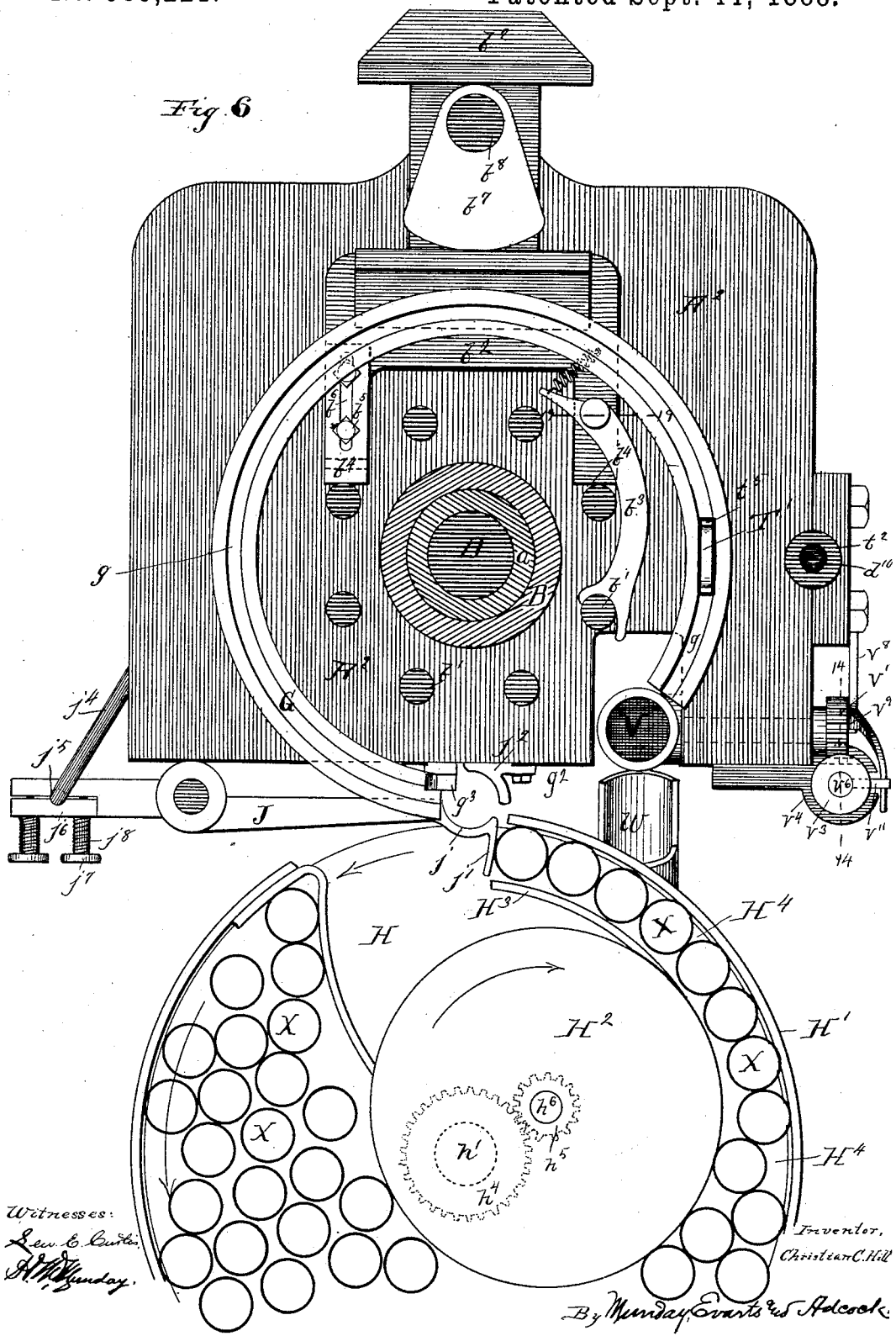

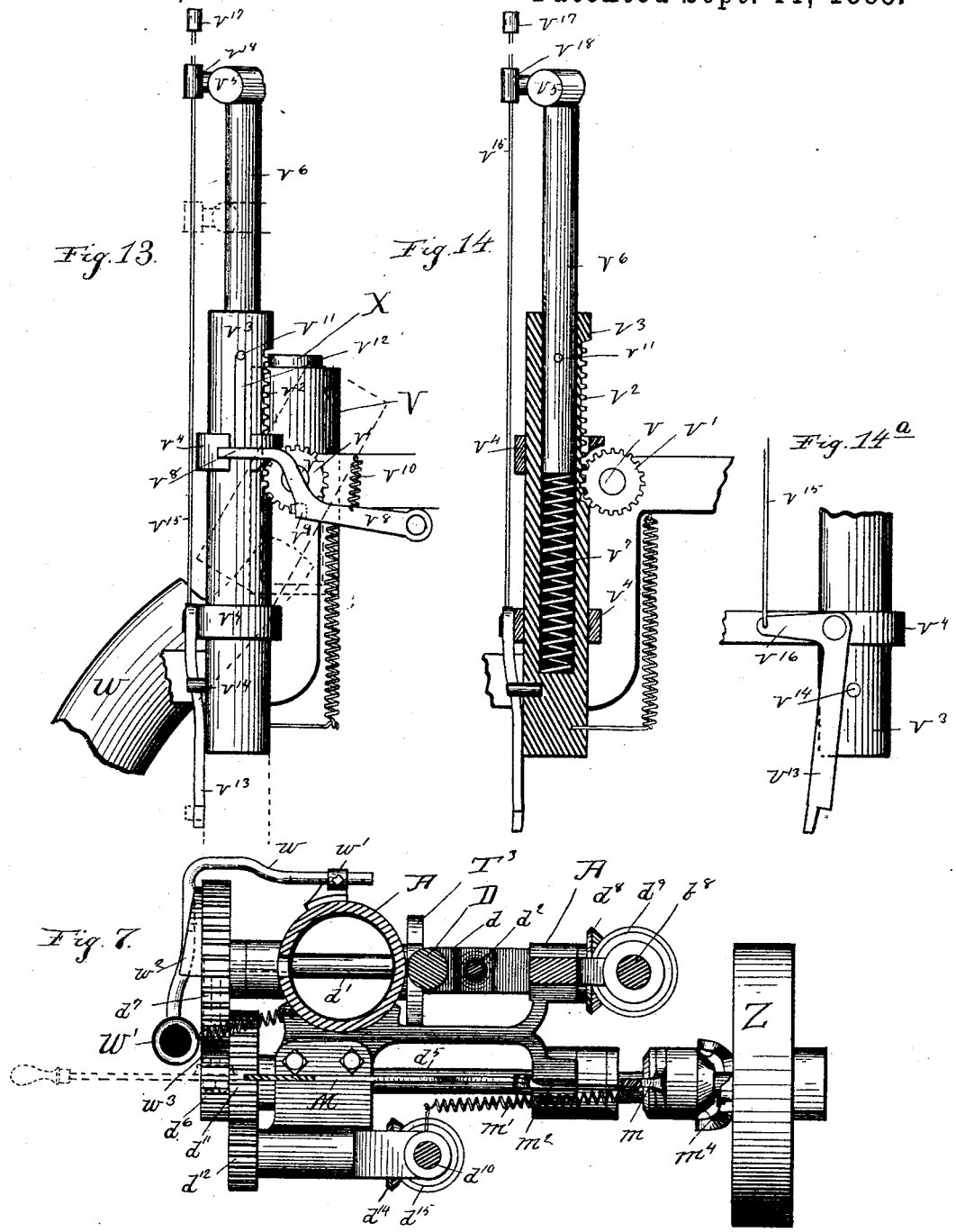

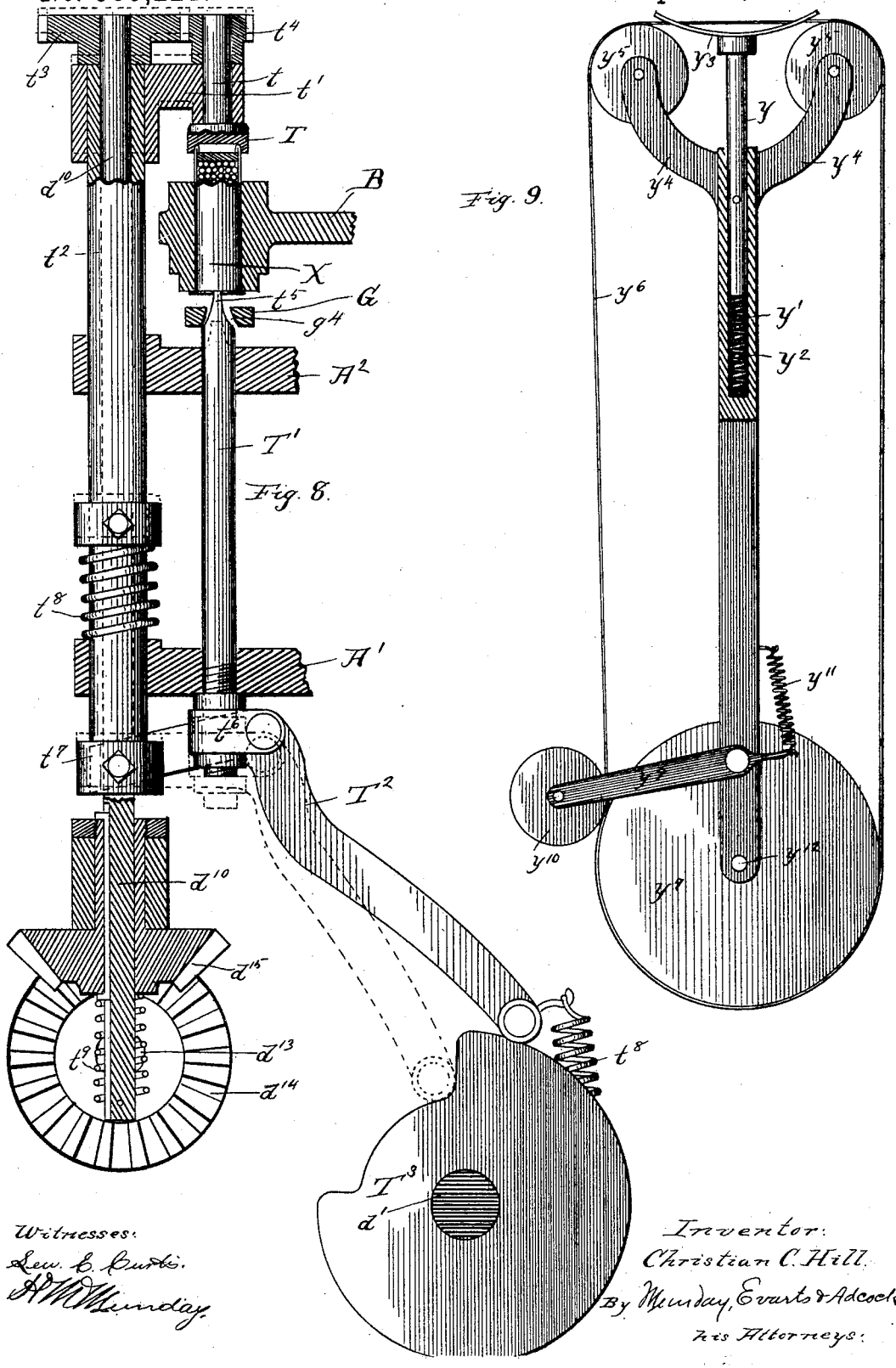

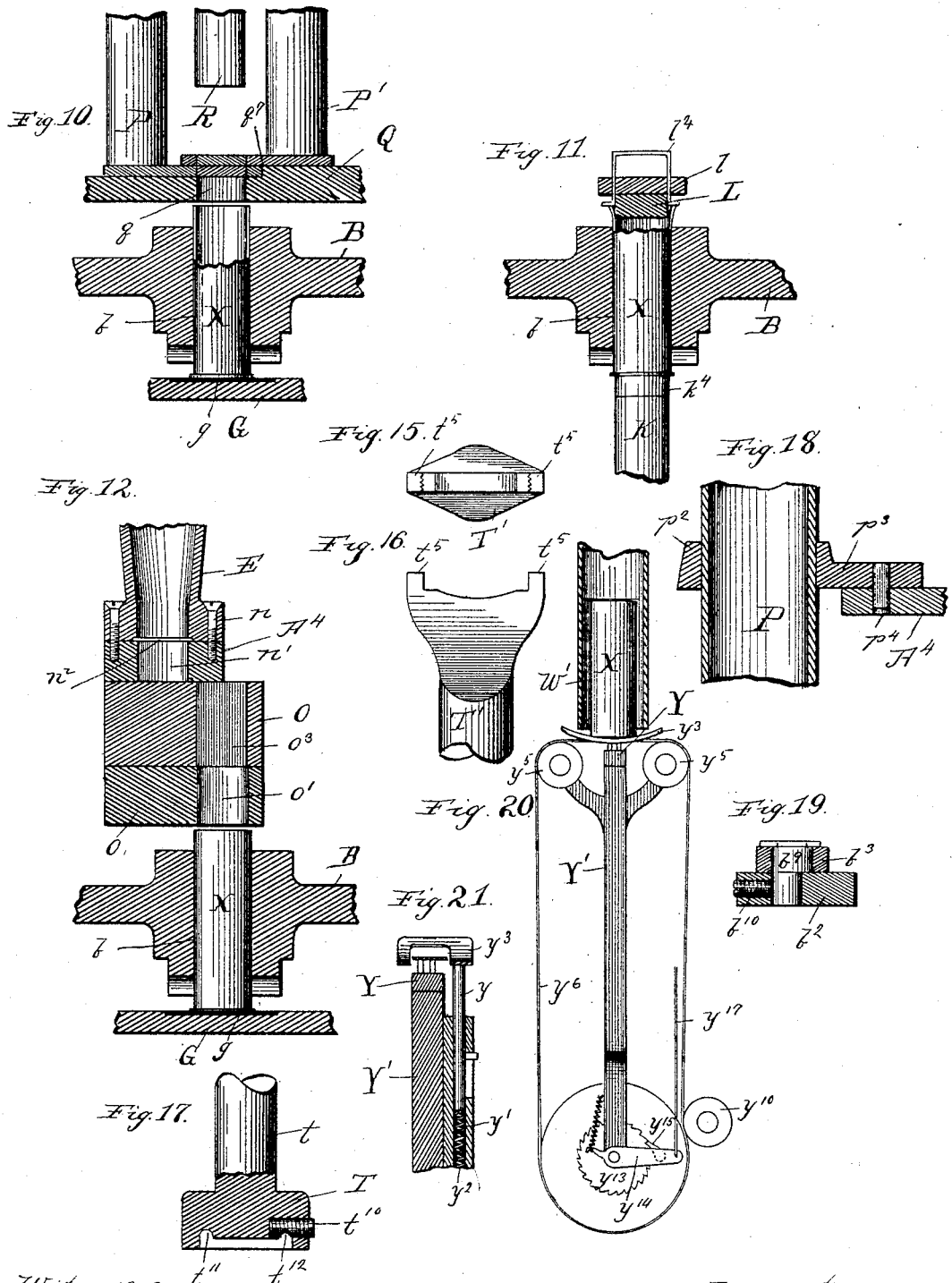

United States Patent Office.

CHRISTIAN C. HILL, OF CHICAGO, ILLINOIS, ASSIGNOR, BY MESNE ASSIGNMENTS, TO E. W. BLATCHFORD, OF SAME PLACE.

CARTRIDGE-LOADING MACHINE.

SPECIFICATION forming part of Letters Patent No. 389,221, dated September 11, 1888.

Application filed September 24, 1887. Serial No. 250,570. (No model.)

*To all whom it may concern:*

Be it known that I, CHRISTIAN C. HILL, a citizen of the United States, residing in Chicago, in the county of Cook and State of Illinois, have invented a new and useful Improvement in Cartridge-Loading Machines, of which the following is a specification.

My invention relates to improvements in machines for loading cartridges, and more particularly cartridges for shotguns.

The object of my invention is to produce an efficient and durable power-driven machine which will operate rapidly to feed the cartridge-shells to the machine, load them with powder, shot, and wads, crimp them, and mark them as they are discharged.

In my invention the shells are placed erect with their open ends upward upon a slowly-revolving horizontal disk having a stationary rim or guard and provided with an eccentrically-mounted oppositely-revolving interior roller, the peripheral surface of which constitutes, in connection with the stationary rim, a convergent path, along which the shells are continuously advanced by the revolving disk. The narrowest part of this path is but wide enough for only a single shell to pass at a time, so that the shells will be passed or fed along in single file in a continuous line. By reason of the interior roller revolving in the opposite direction from the feed-wheels all tendency of two or more shells wedging together in the wider part of the convergent path is prevented.

A feed gate or lever having a pocket to receive a single shell at a time vibrates intermittently across the open end or mouth of the feed-path and serves to slide or move the shells one at a time over a vertically-reciprocating feed-plunger and under one of the holes or shell-receptacles in an intermittently-revolving horizontal shell-carrier disk or frame. The shell-carrier is furnished with as many different holes or receptacles for shells as there are different operations to be performed in the loading of the shell, so that all the different operations may be performed at the same time, one shell receiving one operation, while another shell receives another operation.

Just beneath the circular row of shell-holes in the shell-carrier is a stationary circular track, upon which the bottom or closed end of the shell rests and slides as the shell is carried around in and by the carrier. This circular track is provided with a central groove or channel therein for the primer, and the track is continuous excepting at the point where the vertically-reciprocating feed-plunger pushes the shell upward into one of the holes or receptacles of the shell-carrier. As the shell is pushed into the shell-carrier, and while it is still supported by the shell-feed plunger, a flaring plunger is forced slightly into the mouth of the shell, to slightly spread the same and cause it to better and more readily receive the powder and wads. As I ordinarily build my machine, the shell-carrier is provided with eight shell-receptacles, and it is turned one-eighth of a revolution at each movement. While one shell is being thus fed into the machine and its mouth spread the next preceding shell is receiving its charge of powder. The powder-holding vessel or hopper is mounted on the frame of the machine, and is furnished at its lower end or mouth with a horizontally sliding or oscillating valve having a charge-measuring pocket or receptacle, and which operates to intermittently deliver to the shell its charge of powder. The size or capacity of the pocket in the valve is made adjustable, so that any desired charge of powder may be delivered to the shell. At the same time the third preceding shell receives two wads—one felt wad and one paper wad. The wad-holders for these two separate wads are mounted on the frame of the machine on opposite sides of the rammer, which forces them into the cartridge. Each wad-holder consists of a vertical tube, and is furnished with a horizontally sliding or oscillating feed-valve, each of which is provided with a semicircular pocket, which operates in conjunction with a pivoted clamp-arm having a similar semicircular pocket to clamp a single wad and carry it over the mouth of the shell. These wad-feed valves or levers are pivoted to shut together, one over the other, like the blades of a pair of shears, and thus impose one of the wads directly above the other, so that one and the same rammer will force them both simultaneously into the shell. The next or fourth preceding shell at the same time receives a third wad upon the powder, if it is desired, and the wads are rammed home with the requisite degree of pressure by a weighted rammer, which is intermittently raised by appropriate mechanism and allowed to descend by its own weight upon the wads in the shell. By this means each shell will be rammed with a uniform and the desired force or pressure. The preceding rammer, before referred to, is simply designed to force the first two wads into the shell without exerting any compressing force upon the charge of powder. It may, however, if desired, be also a weighted rammer, which is raised and allowed to descend by its own gravity. I prefer, however, to give this first rammer a positive motion. The next or fifth preceding shell at the same time receives a charge of shot. The shot-holding vessel or hopper is mounted on the frame of the machine and furnished with a feed-valve similar to the powder-valve. The powder and shot valves are both mounted on a common lever, which is pivoted or journaled on the hollow central pedestal portion of the frame of the machine. The next or sixth preceding shell at the same time receives a wad on top of the charge of shot, which is forced into the shell by a vertically-moving rammer. This rammer or plunger may preferably be a weighted rammer, which is raised and allowed to descend by its own gravity upon the wad. As it is only desired, however, to merely push this shot-wad home without exerting any pressure or compression upon the charge of shot, good results may be had by employing a rigid and positively-driven rammer. The next or seventh preceding shell is at the same time being crimped or its upper edge rolled inwardly down to hold the shot-wad or final wad snugly in place. The crimping is done by a continuously-revolving crimper mounted on a sliding shaft in connection with an oppositely-moving sliding holder, which engages the rim or extractor portion of the shell and projects up through a suitable slot or opening formed in the circular track upon which the shells ride. The crimper-shaft and the holding-plunger are forced toward each other positively by a lever, to which they are both connected, and which is operated by a cam. Springs serve to withdraw the holding-plunger and to raise the crimper-shaft and crimper out of the way of the succeeding shell when the crimping has been done. By this means the shells will be positively and uniformly crimped, so that the final wad will be held snugly and uniformly in place against the shot. The next or eighth preceding shell is at the same time forced out of its receptacle in the carrier by a reciprocating plunger or extractor. The loaded shell, as it leaves the carrier, is received into a reversing tube or receptacle just below the carrier, which operates to turn the shell end for end and deliver it into a chute, through which the shell descends by its own gravity upon a type or marker located at the lower end of the chute, and by which the final wad is stamped or marked with any desired data—as, for example, the size of the shot and the amount of the charge of powder and shot.

In the accompanying drawings, which form a part of this specification, and in which similar letters of reference indicate like parts, Figure 1 is a side elevation of a machine embodying my invention. Fig. 2 is a similar view, enlarged, looking from the opposite side of the machine. Fig. 3 is a partial central vertical section. Figs. 4 and 5 are horizontal sections taken on line 4 4 of Fig. 2, the former showing the wad-feed slides in position to receive the wads from the wad-holders, and the latter showing the same in position to deliver the wads to the shells. Fig. 6 is a horizontal section taken on line 6 6 of Fig. 2. Fig. 7 is a horizontal section taken on line 7 7 of Fig. 2. Fig. 8 is an enlarged detail view of the crimping mechanism. Fig. 9 is an enlarged detail view of the printing or marking device. Fig. 10 is a section on line 10 10 of Fig. 5. Fig. 11 is a section on line 11 11 of Fig. 5. Fig. 12 is a section on line 12 12 of Fig. 5. Fig. 13 is a side elevation of the device for reversing or turning the cartridge end for end. Fig. 14 is a section on line 14 14 of Fig. 6. Fig. 14$^a$ is a detail side elevation of the pawl-lever shown in Figs. 13 and 14. Figs. 15 and 16 are detail views of the holding-plunger. Fig. 17 is a detail section of the crimper. Fig. 18 is a vertical section through one of the wad-holders. Fig. 19 is a section on line 19 19 of Fig. 6, and Figs. 20 and 21 are detail views of the marker.

In said drawings, A represents the frame of the machine, which may be of any suitable construction. It is, however, preferably provided with four horizontal plates, A', A², A³, and A⁴, to provide suitable supports and space for the various parts or devices of the machine, the separate plates being supported by or secured upon suitable pillars or pedestals, A⁵ A⁵ A⁵. The plate A² is furnished with an upwardly-projecting boss or hub, $a$, to afford a pivot for the horizontal intermittently-revolving shell-carrier B to turn upon as well as for the shot and powder valve lever C. This hollow stem or boss $a$ also serves as a bearing or slideway for the sliding bar or shaft D, as clearly indicated in Fig. 3. The powder-hopper E and the shot-hopper F are rigidly secured to the upper plate, A⁴, on the frame.

The carrier B is furnished with a series of shell-receptacles, $b$, preferably eight in number, as indicated in the drawings. These shell-receptacles may consist simply of round holes in the carrier, the same being arranged equidistant apart and in a circle around the axis of the carrier. The carrier may consist of a circular disk or of a spider having as many radial arms as there are shell-receptacles in the carrier. This latter is the lighter and therefore preferable construction, though for convenience in the drawings it is shown as a circular disk. The carrier is intermittently rotated and locked in position by means of eight pins, $b'$, secured to the carrier on its under side, which are engaged by a reciprocating slide, $b^2$, having a pivoted pawl, $b^3$, and two stops, $b^4$ $b^4$. The stop $b^4$ is adjustably fixed to the slide $b^2$ by screws $b^5$, which pass through a slot, $b^6$, in the stop projection $b^4$. The slide $b^2$ is reciprocated by a cam, $b^7$, on the vertical shaft $b^8$. G is a circular track having a groove, $g$, for the primer of the cartridge. It is located just under the carrier, and is supported from the frame-plate $A^2$ on adjustable posts or threaded bolts $g'$. This track G is cut away at $g^2$ to leave an opening through which the cartridge may be upwardly pushed into its receptacle in the carrier, and through which opening also the loaded cartridge may be discharged. The track G is further provided with a spring-pawl, $g^3$, at its end, where the cartridges are received, which operates to hold or support the cartridge as the carrier advances after the feed-plunger has receded.

H is the continuously-revolving horizontal shell-feed disk, H' its stationary rim or guard, and $H^2$ the small oppositely-revolving eccentrically-placed roller or disk inside the rim H'.

$H^3$ is a short inner rim leading about tangentially from the periphery of the roller $H^2$ at the point where its periphery is nearest to the rim. The rim H' is supported from the frame of the machine by a bracket, $h$. The disk H is secured on the upper end of a revolving shaft, $h'$, which is journaled in a vertical sleeve or bearing, $h^2$, secured to the lower plate, $A'$, of the frame. The inner small eccentric roller, $H^2$, is journaled and supported upon a stud or bracket, $h^3$, secured to the frame-plate $A^3$. The roller $H^2$ is revolved in the opposite direction from the disk H by a gear, $h^4$, on the shaft $h'$, which meshes with the gear $h^5$ on the shaft $h^6$ of the roller $H^2$. The gears $h^5$ $h^4$ are located between the roller $H^2$ and disk H. The roller or disk $H^2$, I preferably make of wood. It may, however, be made of metal, in which case I would make it inverted-cup shape. The disk H or its shaft is revolved continuously by means of a bevel-gear, $h^7$, thereon, which meshes with the bevel-gear $h^8$ on the horizontal shaft $h^9$, which is furnished with a worm-gear, $h^{10}$, that meshes with a worm, $h^{11}$, on the vertical shaft $b^8$. The short inner rim, $H^3$, which forms the parallel part of the converging shell-feed path $H^4$, is supported from the upper bracket, $h^3$, by a downwardly-projecting arm, $h^{12}$.

J is a horizontally-vibrating feed-gate lever, provided with a semicircular or curved pocket, $j$, near its end, and a gate, $j'$, which fits across the mouth of the shell-passage $H^4$. Bolted to the frame of the machine opposite the curved pocket $j$ is a corresponding curved pocket, $j^2$, which operates, in conjunction with the feed-gate lever, to hold the shell in place and guide it as it is pushed upward by the feed plunger into the shell-receptacle of the carrier. The feed gate or lever J is operated by a cam, $j^3$, through the forked arm or link $j^4$, which is pivoted at $j^5$ to the short arm of the lever J. The pivot $j^5$ is not secured rigidly to the lever J, but is secured thereto through a clamp-block, $j^6$, which may slide outward on the pins or studs $j^7$, and is held in place by springs $j^8$, surrounding said pins. The purpose of this is to allow the feed-lever to yield in case it should meet with any unusual resistance in its movement.

K is the feed-punch, which forces or feeds the shell upward into its receptacle $b$ in the carrier B. This vertically-sliding feed-punch is intermittently reciprocated as required by means of a rack, $k$, on the vertically-sliding bar D, meshing with the pinion $k'$, which meshes with the rack $k^2$ on the feed-punch. The feed-punch slides in a suitable bearing, $k^3$, on the frame of the machine. It is made hollow and provided with an interior sliding pin, $k^4$, having a cam or projection, $k^5$, near its lower end, which operates a pawl, $k^6$, pivoted to the plunger K near its lower end in a slot or recess cut therein. The rod or pin $k^4$ is made slightly longer than the plunger K, so that its upper end will project somewhat above the end of the plunger K. The plunger-pin $k^4$ fits somewhat snugly or with some degree of friction in the plunger K, so that this pin will normally remain in whatever position it is placed. As the plunger moves up to force the cartridge into the carrier, if a cartridge is in place in the pocket of the feed-gate, the resistance offered by the cartridge will push the pin $k^4$ down in the plunger, so that the cam $k^5$ on the pin $k^4$ will permit the pawl $k^6$ to swing inward, so that when the plunger makes its return movement the pawl will not strike the clutch-lever-operating arm $k^7$. If, however, there happen to be no cartridge in place in the feed-gate, the sliding pin $k^4$ will meet with no resistance, and consequently it will continue to hold the pawl $k^6$ out, and thus cause the same to strike the clutch-lever-operating arm $k^7$, and thus stop the machine.

To cause the sliding pin $k^4$ to be pushed up at each movement of the plunger K, a stop projection or arm, $k^8$, is secured to the frame of the machine, so that the lower projecting end of the sliding pin will strike the same. To permit the pawl $k^6$ when held out by the cam on the pin $k^4$ to pass the end of the clutch-lever-operating arm $k^7$, I may provide the same with a pivoted latch or jointed end, $k^9$. By this means the whole machine will be instantly stopped in case no cartridge is presented by the feed-gate lever to the feed-plunger, so that none of the cells $b$ in the carrier can move around empty.

L is a conical or flaring shaped spreading-tool, which operates to spread the mouth of the shell. It is operated by a lever, $l$, which is pivoted to the frame at $l'$ and actuated by a projecting arm, $l^2$, secured to the vertically-sliding bar D. A spring, $l^3$, serves to give its return movement to this spreading tool lever. While the shell is being operated upon by the spreading-tool, it is supported by the feed-plunger K, and the resistance offered by the spreading-tool to the upward movement of the shell serves in part to push down the sliding pin $k^4$ of the feed-plunger, which operates the clutch to stop the machine in case there is no shell in place in the pocket of the feed-gate and resting on the feed-plunger. However, this stop-pin $k^4$ may encounter other resistance in case the spreading-tool is not desired to be used. For example, the feed-gate lever J may operate to clamp or hold the shell with sufficient force between the pocket $j$ and the stationary pocket $j^2$ to give the necessary resistance; or the cells $b$ in the carrier may be made to fit the shells so closely as to offer sufficient resistance to operate the sliding stop-pin $k^4$. In whatever way the stop or clutch pin is operated it is desirable that the cells $b$ in the carrier fit the shells pretty snugly in order to prevent the shells being bulged or enlarged by the ramming.

M is the clutch-operating lever, which is connected with the arm $k^7$, that projects in the path of the pawl $k^6$ on the feed-plunger K. The end of this lever is connected to the clutch-lever $m$ by a pivoted link, $m^2$. As long as the end of the lever M is above the center, or above a straight line connecting the pivot of the lever and the pivot of the link $m^2$, the link $m^2$ will prevent the spring $m'$ from operating the clutch-lever $m$; but the instant the end of the lever M is lowered past the center by means of the sliding pin $k^4$ the spring $m'$ will then move the clutch-lever and disengage the fly and band wheel from the machine. By this means the feed plunger is only required to touch the trigger, so to speak, the spring $m'$ doing the work of moving the clutch. The clutch $m^4$ may be of any ordinary construction.

E and F are the powder and shot hoppers or vessels, respectively. They are rigidly secured to the upper frame-plate, $A^4$, of the machine, being each furnished with collars $n$, bolted to said frame-plate. Openings $n'$ through the supporting-plate $A^4$ permit the powder and shot to pass through the same into their measuring-valves O O'. Cut off slides $n^2$ on the upper face of the frame-plate $A^4$ may be pulled in or out by hand and serve to close the discharge-openings $n'$ $n'$ when desired. The powder-valve O and shot-valve O' both slide or oscillate under the frame-plate $A^4$ and above the stationary valve-plates $o$, which have discharge-openings $o'$, through which the measured charges of powder and shot are delivered into the shell. The plates $o$ are each supported upon or bolted to the frame-plate $A^3$, the ends of the plates $o$ being bent down to raise the plates the requisite distance above the frame-plate $A^3$. The powder-valve O has a measuring pocket or receptacle, $o^3$, designed to hold a charge of powder, and the shot-valve O' has a similar measuring-pocket, $o^4$, for the shot. Each of these valve pockets or chambers is preferably made rectangular in shape, so that their size may be readily adjusted, each valve-pocket being provided with a sliding side or end, $o^5$, operated by an adjusting-screw, $o^6$. The valve-pockets $o^3$ $o^4$ should further be provided with a marked scale, $o^7$, to indicate the weight of the charge at the different positions of the adjustable slide $o^5$. The valves O and O' close the powder and shot discharge openings in the plate $A^4$ as they slide or oscillate forward to transfer the charges to the shells through the discharge-openings $o'$. The discharge-openings $o'$ should both be made somewhat inclined or hopper-shaped, and preferably terminate in a round hole at the bottom corresponding to the shape of the shell, while at the top they should be rectangular corresponding to the shape of the valve-pockets $o^3$ $o^4$. The valves O O' are preferably each secured to or made integral with a common operating-lever, C. Separate levers, however, may be used for each valve, if desired. The valve lever C is journaled upon the upwardly-projecting hub $a$ of the frame-plate $A^2$, upon which the carrier B also turns. The valve-lever C is intermittently oscillated or moved in one direction, as required, by means of a cam, $o^8$, on the vertical shaft $b^3$, which engages a projection, $o^9$, on the lever C, and in the opposite direction by a projection, $o^{10}$, on the upper flat face of said cam, which engages the notched link or pawl $o^{11}$, that is pivoted to a wing or arm, $o^{12}$, on the valve-lever. A spring, $o^{13}$, keeps the pawl or link $o^{11}$ in place.

P, P', P², and P³ are the several wad-holders, the first three being for the powder and the last for the shot. Each of these wad-holders preferably consists of long tubes having one or more slots, $p$, cut therein, so that the attendant may readily see when the tubes are becoming empty. The wad-holding tubes are also preferably made removable, so that one set of the tubes may be filled with wads while another set is in the machine.

The wad-holders P, P', P², and P³ are each provided with a collar, $p^2$, having a projecting flange, $p^3$, furnished with two or more steady-pins that fit in suitable sockets or holes, $p^4$, in the frame-plate $A^4$, whereby the lower ends of the wad-holders are rigidly supported in proper position and at the same time made readily removable from the machine. The upper ends of the wad-tubes are secured by hinged clamps $p^5$, which are mounted upon the bracket $p^6$, secured to the frame of the machine. Beneath the two wad-holders P P' is a wad-feed plate, Q, having an opening, $q$, between the two wad-holders, through which the two wads, one from each wad-holder, is pushed by the rammer R into the shell below. The lower ends of the wad-holders P P' are arranged above this plate Q just the thickness of the respective wads in the two wad-holders. The wad-holder P usually contains a felt or thick wad, and the valve-holder P' a paper or thinner wad. The wads are fed one by one from the wad-holders P P' to the discharge-opening $q$ in the plate Q by means of a pair of oscillating or oppositely-sliding wad-feed valves or slides, $q'$ $q^2$. These wad-feed slides are each furnished with a semicircular pocket, $q^3$, and an opposing pivoted clamp-arm, $q^4$, having a similar semicircular receptacle or pocket, $q^5$, between which the wads may be clamped. The wad-feed valves $q'$ $q^2$ are each preferably pivoted to swing upon the same center or pivot $q^6$, and the valve $q^2$ fits or shuts over the under valve, $q'$, so that the wad in the valve or slide $q^2$ will be imposed directly over the wad in the valve $q'$. The plate Q is furnished with a shoulder, $q^7$, or made thicker at one end than the other to the extent of the thickness of the valve or slide $q'$, so that the wad in the valve or slide $q^2$ will be properly supported by the plate Q as it is fed or moved into place and until it is imposed over the slide $q'$ and the wad therein. Each of the wad-clamp arms $q^4$ is furnished with a spring, $q^8$, which serves to hold the clamp closed upon the wad, and a projecting arm, $q^9$, which strikes against stops $q^{10}$ $q^{11}$ to open the clamp-arms. When the wad-slides $q'$ $q^2$ are swung back under their respective wad-holders P P' to receive the wads, the clamp-arms $q^4$ are opened by the arms $q^9$ striking against the stops $q^{10}$ $q^{11}$, and as the valve-slides move forward or together to carry the wads therein over the wad-discharge opening $q$, the arms $q^9$ of course swing away from the stops $q^{10}$ $q^{11}$, so that the springs $q^8$ will close the clamp-arms upon the wads, and thus hold or support the same in a horizontal position over the discharge-opening $q$, so that they will be forced down through such opening and into the shell in a flat and proper position by the rammer R. The wad-feed slide $q'$ is provided with a stop projection, $q^{12}$, that fits against the opposing wad-feed slide $q^2$ or its clamp $q^4$, to prevent the two slides from shutting together too far.

Beneath each of the wad-holders P² and P³ is a wad-feed plate, Q' Q², having discharge-openings $q^{13}$ $q^{14}$, like that in the plate Q. The wad-feed slides $q^{15}$ $q^{16}$ are similar in construction and operation to the slides $q'$ $q^2$ and have similar pockets, $q^{17}$ $q^{18}$, clamp arms $q^{19}$ $q^{20}$, provided with springs $q^{21}$ $q^{22}$, and short arms $q^{23}$ $q^{24}$, which strike against stops $q^{25}$ $q^{26}$.

All the wad-feed slides are preferably operated simultaneously by a single cam, S, on the vertical shaft $b^3$, through a single lever, S', which has a pin or roller, S², that fits in the groove-cam. The wad-feed slide $q'$ is actuated from this lever S' through a pivoted link, $s$, the feed-slide $q^2$ through a similar pivoted link, $s'$, and the wad-feed slide $q^{15}$ through the link $s^2$. The wad-feed slide $q^{16}$ is operated through a link, $s^3$, which is pivoted to the wad-feed slide $q^{15}$, instead of directly to the lever S'.

The rammer R, which pushes the two first wads down upon the powder in the shell, is connected rigidly to the sliding bar or shaft D through a bracket or arm, D', thereon. This first rammer operates simply to push the two first wads down upon the powder, so that the shell may receive the third wad from the wad-holder P², and, as it is not designed to compress the powder at all, it may be connected positively or rigidly to the vertically-sliding bar D. The rammer R is fixed to the arm D' by a set-screw, $r$. If it is preferred to force the two first wads into the shell with a certain fixed or definite amount of pressure, this may be done by removing the set-screw $r$, so that the rammer may slide loosely through the bracket D', and thus have no connection with the reciprocating bar D when said bar is making its downward movement, and then putting a weight, as $r^2$, on the rammer. The weight $r^2$ will thus be the only and sole force which pushes the wads into the shell. In this case the weighted rammer will simply be raised by the upward movement of the bar D. This may be done by the bracket D' bearing against the shoulder formed on the rammer by securing the weight $r^2$ thereto.

R' is the weighted rammer, which operates to force the third wad into the shell and to ram or compress the wads and powder to the fixed and definite extent desired. This rammer fits loosely in a hole or bearing in the bracket-arm D², and has a shoulder, $r'$, above, so that the upward movement of the bar D will operate to raise the weighted rammer. The weight $r^3$ is not placed directly on top of this rammer, but, for convenience, is suspended by a rod, $r^4$, from the outer end of a lever, $r^5$, which rests in a slot, $r^6$, cut in the upper end of the rammer. The inner end of the lever $r^5$ is pivoted to the end of the sliding rod D or to a knot, $r^7$, secured thereto. By this means the weight is removed from the top of the machine, and the lever also serves to increase or multiply the pressure of the weight upon the rammer. By means of the weighted rammer, which is simply elevated by the sliding rod or bar D, and which then descends and exerts simply the pressure or force due to its own weight upon the wads in the shell, all the shells may be rammed uniformly and the proper amount of compression exerted upon each charge, and the rammer requires no adjustment of any kind in respect to the stroke or extent of movement of the sliding bar D, or in respect to the size of the charge or the extent to which the shell is filled thereby. The weighted rammer is simply made with a non-adjustable rigid shoulder, $r'$, which I ordinarily make integral with the rammer itself, and the bracket D² is also fixed immovably to the sliding bar or rod D, and may be cast integral therewith, if desired.

In my machine, if the size of the powder-charge is changed, or if the number or thickness of the wads placed on top of the powder is altered, it in no way affects the amount of pressure exerted by my weighted rammer upon the charge. In all cartridge-loading machines which have heretofore been made, so far as I know, any change, either in the amount of the charge or in the number or thickness of the wads, materially affects the pressure of the rammer, and for such change the rammer requires nice and difficult adjustments to be made.

R² is the rammer by which the final wad is pushed down upon the charge of shot. As it is not desirable to exert any compressing force upon the shot, but simply to push this wad down a fixed distance into the shell, this rammer may be connected, and I ordinarily do connect it rigidly to the sliding bar D, so as to give this rammer a fixed and positive movement. If preferred, however, the rammer may be weighted the same as the rammer R'; but as a comparatively small weight, $r^6$, is all that is required on this rammer, I ordinarily place it directly on top of the rammer, instead of using the suspended weight and lever. In case this rammer is furnished with a weight, $r^6$, as indicated in the drawings, it is mounted to slide loosely on the bracket-arm D³ when the bar D makes its downward movement, and is elevated by the bracket-arm striking against a shoulder on the rammer as said bar makes its upward movement.

The rod or bar D is reciprocated by a crank, $d$, on the shaft $d'$ through the pitman $d^2$, which is pivoted to a pin, $d^3$, on said bar D. The opposite end of this pin $d^3$ fits in a vertical slot or guide in the post $d^4$. The crank-shaft $d'$ is geared to the horizontal driving-shaft $d^5$ through the gears $d^6$ $d^7$. The vertical shaft $b^8$ is driven from the crank-shaft $d'$ through the bevel-gears $d^8$ $d^9$, and the crimper-operating shaft $d^{10}$ is driven from the driving-shaft $d^5$ through the spur-gears $d^{11}$ $d^{12}$, shaft $d^{13}$, and bevel-gears $d^{14}$ $d^{15}$.

The crimper T is secured on the end of the revolving shaft $t$, which is journaled on an arm, $t'$, carried by the sliding hollow sleeve or tube $t^2$, through which the crimper-operating shaft $d^{10}$ passes and in which it revolves. The crimper-shaft $t$ is driven from the shaft $d^{10}$ through the gears $t^3$ $t^4$. The shaft $d^{10}$ is splined, so that it may slide through the bevel-gear $d^{15}$. The cartridge-shell $x$ is held from revolving while being operated upon by the crimper by means of a vertically-moving plunger, T', having a pair of projecting lugs, $t^5$, furnished with vertical or longitudinal ribs or corrugations on their inner surface, which engages with the rim of the cartridge, and thus serves to hold the cartridge from revolving. This holding-plunger T' reciprocates through a slot or opening, $g^4$, in the circular track G. The crimper T and holding-plunger T' are forced toward each other, so as to clamp the shell between them, by means of a lever, T², which is pivoted to suitable collars, $t^6$ $t^7$—the one on the plunger T and the other on the sleeve $t^2$. This lever is operated by a cam, T³, on the crank-shaft $d'$. The sleeve $t^2$, as well as the plunger T' reciprocate in suitable holes or guides in the frame-plates A' A². Coil-springs $t^8$ serve to elevate the crimper-sleeve $t^2$ after the crimping is done and to withdraw the plunger T' out of the way beneath the track G. A lighter spring, $t^9$, serves to hold the spline-shaft $d^{10}$ in place. The crimper T is furnished with two, three, (preferably three,) or more radial screws or pins, $t^{10}$, which project across the circular groove $t^{11}$ in the under face of the crimper. These pins are furnished with small transverse notches or grooves, $t^{12}$, concentric with the circular groove in the crimper. These pins may be removed and replaced by others when worn, and they also facilitate the operation of the crimper.

U is the plunger, which pushes the loaded shell out of its cell into the carrier. It is secured to an arm, D⁴, on the bracket D', and is operated by the sliding bar or rod D.

V is the device for reversing the shell or turning it end for end as it is discharged from the carrier. It preferably consists of a cylindrical-shaped cup provided with a pivot or shaft, $v$, upon or by which it is turned. The shaft $v$ is operated by a gear, $v'$, thereon, which meshes with a rack, $v^2$, on the hollow reciprocating rack-bar $v^3$. The bar $v^3$ reciprocates in suitable guides, $v^4$, on the frame of the machine, and is operated by a projecting arm, $v^5$, secured to the extractor-plunger U. This arm does not impinge directly against the rack-bar, but against a yielding pin, $v^6$, which rests upon the coil-spring $v^7$ in the hollow rack-bar. A spring-pawl, $v^8$, having a lug, $v^9$, which engages the gear $v'$, holds the gear from revolving and the cup V from turning, except when this pawl is pressed down against the action of the spring $v^{10}$ and disengaged from the gear. As the yielding rod or bar is pushed down by the descending movement of the plunger U, a pin, $v^{11}$, on said rod $v^6$, which projects through a slot, $v^{12}$, in the hollow rack-bar $v^3$, strikes against the pawl $v^8$ and releases the gear $v'$, so that the compressed spring will operate to quickly move the rack-bar, turn the gear $v'$, and thus reverse the cup V, so that the cartridge therein will be discharged with its upper end downward through the chute W.

As it is desirable to hold the cup V in its inverted position some little time to give opportunity for the cartridge to slide out of the cup, I provide a pawl or lever, $v^{13}$, which fits over a projection or pin, $v^{14}$, on the rack-bar when it reaches the downward limit of its motion, and holds it in this position until the pawl is disengaged from said projection $v^{14}$. The disengagement of the pawl is effected by a rod, $v^{15}$, connected to the bent arm $v^{16}$ of the pawl-lever, and which is provided with a head or enlargement, $v^{17}$, which strikes against the arm $v^{18}$, through which said rod slides. The arm $v^{18}$ is secured to the arm $v^5$. By this means the reversing-cup may be held in its reversed position until the arm $v^5$ or the sliding bar D, to which it is secured, almost finishes its upward stroke, so that plenty of time will be given for the cartridge to fall out of the reversing-cup.

The chute W is secured to the frame of the machine, and is preferably curved, about as indicated in the drawings, in order to convey the cartridge out to the side of the machine, where it is preferable to locate the marking device or type Y. The lower portion of the discharge-chute, which is indicated by W', I prefer to make movable, so that the cartridge may be supported and guided by the tube entirely down to the marker. However, the discharge-chute may be made stationary throughout its whole length, one side of the tube being cut away at its lower end to permit the cartridges to fall out after they strike the marker. The movable part W' of the chute is supported on a horizontally-swinging lever, $w$, pivoted at $w'$ to the frame of the machine, and which is operated by a cam, $w^2$, fixed on the side face of the gear $d^7$ on the crank-shaft $d'$. A spring, $w^3$, returns the tube W' to place immediately after the marked cartridge is discharged therefrom.

Any suitable kind of a marker may be employed which will operate to print the requisite data upon the final wad in the shell. That which I prefer to employ I have shown in the drawings. The type or marker Y is secured upon the end of the standard Y'. A yielding pin or rod, $y$, which fits in a socket, $y'$, in the standard Y', its end resting upon a coiled spring, $y^2$, supports a slotted guard-plate, $y^3$, above the type. The standard Y' is supported by a bracket, Y², secured to the frame of the machine. The upper end of this standard is furnished with two arms, $y^4$, on which are journaled a pair of tape-rolls, $y^5$, for the inking tape or ribbon $y^6$. The lower end of the standard Y' has a tape roller, $y^7$, journaled thereon, and a pivoted arm or lever, $y^9$, carrying the inking-roller $y^{10}$. The inking-roller is pressed against the ribbon by a spring, $y^{11}$. The shaft $y^{12}$ of the roller $y^7$ is furnished with a ratchet, $y^{13}$, pawl-lever, $y^{14}$, and pawl $y^{15}$, which pawl-lever is connected to a wrist-pin, $y^{16}$, on the crank-shaft $d'$ by a link or rod, $y^{17}$, whereby the tape-roller is slowly revolved to move the ribbon. The yielding pin or rod $y$, with its slotted guard-plate $y^3$, serves to support the cartridge after it has struck the type and prevent its again striking the same on its rebound. The spring $y^2$ is made so light that the cartridge falling through the tube will readily depress the pin and slotted guard-plate below the type or marker Y and make the impression. A few inches fall is sufficient to cause the loaded cartridge to strike the type with sufficient force to make a distinct impression. The type of the marker may be made of metal, rubber, or other suitable material. I ordinarily, however, use metal type. The force which makes the impression is simply the falling weight of the cartridge, the marking being thus done on the same principle as the ramming of the powder by my weighted rammers. By this means the marking may be done without subjecting the final wad, which rests upon the shot, to any irregular or undue pressure, tending to compress the charge of shot, to loosen the wad from the shoulder formed by the crimping, or otherwise to injure the shooting qualities of the cartridge. The path or chute through which the cartridge falls may be a vertical or an inclined or curved path. I prefer, however, to let the cartridge fall in a vertical path upon the marker. As the top or shot end of the cartridge is of course the heavier, it is not wholly necessary, though better, to employ a chute or guide for the falling cartridge leading down to the marker, provided, of course, the discharge-opening through which the falling cartridge issues is directly over the marker.

Z is the driving-pulley and fly-wheel connected to the driving-shaft $d'$ by the clutch $m^4$.

The pawl $b^3$, by which the shell-carrier B is revolved, is pivoted to the slide $b^2$ by an eccentric pivot-pin, $b^9$, secured in place by a set-screw, $b^{10}$, so that the position of the pawl may be accurately adjusted. This also affords a means for taking up wear.

The spreading tool L is furnished with a spring, $l^4$, the ends of which press against the shell, in order to withdraw the spreading-tool from the shell.

The wad-holders are each furnished with weights $p^7$, to properly press the wads down through the same. These weights may be long metal rods or bars, or shorter weights suspended by chains or cords from the top of the wad-tubes P P', &c.

As the mouth of the shell projects beyond the shot-wad, the inking ribbon $y^6$ should have sufficient slack to fold readily over the edges of the shell when the type projects into the shell. The roller $y^{10}$ operates as a friction-roller to move the ribbon, notwithstanding the slackness with which the ribbon fits on its carrying-pulleys. Where a previously-inked ribbon is used—such as are employed on typewriters, for example—the only function of the roller $y^{10}$ will be to cause the slack ribbon $y^6$ to properly move on its carrying-pulleys.

I hereby disclaim as not of my invention the cartridge-loading machine shown and described in Patent No. 97,904, of December 14, 1869, to Gill.

I claim—

1. In a cartridge-loading machine, the combination, with an intermittently-revolving horizontal shell-carrier having a series of vertical holes or cells for receiving the shells, of a circular supporting track beneath said carrier, having an opening or openings through which the shells are fed and discharged, a horizontal continuously-revolving shell-feed disk adjacent to said carrier, having a stationary outer rim, an inner rim, and an oppositely-revolving eccentrically-journaled small inside roller, a horizontally-vibrating feed-gate lever having a pocket to receive a single shell from the feed-gate, and operating to deliver the shell to the feed-plunger, a vertically-moving feed-plunger to force the shells into the carrier, a powder hopper, a powder-measuring valve, wad-holders and wad-feed slides, a weighted rammer and mechanism for elevating it and permitting it to descend and compress the charge by its own weight, a shot-hopper, a shot-measuring valve, a lever for oscillating said shot and powder valves and delivering their charges into the shells, a shot-wad rammer, a continuous-revolving crimper, a vertically-moving shell-holding plunger to raise or push the shell against the crimper, an extractor or discharge-plunger, a shell receiving and reversing device or cup located beneath the discharge-plunger, a chute, and a marker beneath the mouth of said chute, said parts being connected, respectively, with each other and with a single operating mechanism, all combined and operating substantially as specified.

2. The combination, with a horizontal shell-carrier having vertical holes or cells for receiving the shells, of a vertically-moving feed-plunger under said carrier and operating to force the shells into the cells thereof, a horizontal revolving shell-feed disk adjacent to said carrier, a stationary guard or guide-rim surrounding said feed-disk, a small inside revolving roller journaled eccentrically or to one side the axis of said disk, and a stationary guide or rim leading from the periphery of said inside roller to the mouth of the feed-passage, and a feed-gate adapted to close the shell-feed passage and having a pocket to receive a single shell at a time and transfer it to said plunger, substantially as specified.

3. The combination, with a horizontal shell-carrier having vertical holes or cells for receiving the shells, of a vertically-moving feed-plunger beneath said carrier, a horizontally-vibrating gate adapted to close a shell-feed passage and having a pocket to receive a single shell therefrom at a time and transfer it to the feed-plunger, and a corresponding stationary guide-pocket on the frame of the machine beneath said carrier, between which and said gate the shell is held and guided as it is forced upward by the feed-plunger into the cell of the carrier, substantially as specified.

4. The combination, in a cartridge-loading machine having a clutch connecting the power device with the loading mechanism, of a shell-carrier provided with cells, a feed-plunger opposite said carrier for inserting the shells therein, and provided with a movable stop device situated in the path of the shell, to be depressed by the shell if any is present, and to operate the clutch to stop the machine if no shell is present, said stop device when not depressed being in position to be connected with and disengage said clutch, substantially as specified.

5. In a cartridge-loading machine, the combination, with a horizontal shell carrier having vertical holes or cells to receive the shells, of a vertically-moving feed-plunger provided with a sliding pin or rod projecting above the surface of said plunger and adapted to be depressed within the plunger by the shell fed to the machine, the clutch of the machine, and a pawl or device for operating said clutch, said sliding pin on the feed-plunger operating to release said pawl or device only when pressed down by the shell, substantially as specified.

6. In a cartridge-loading machine, the combination, with a shell-carrier having cells, of a wad-holder and wad-feed slide, a weighted wad-rammer, and mechanism, substantially as described, connected and operating in conjunction with the said wad-holder and feed-slide for raising the hammer and allowing it to descend by its own weight, so as to strike blows of measured force, substantially as specified.

7. In a cartridge-loading machine, the combination, with a shell carrier having cells, of a wad-holder and wad-feed slide, a wad-rammer having a transverse weighted lever mounted upon a fulcrum which is connected and moves with the rammer-actuating device, said rammer being adapted to descend into the shell with the measured force of gravity, and a guide or bearing to guide the rammer as it descends into the shell, substantially as specified.

8. In a cartridge-loading machine, the combination, with a weighted rammer, of a vertically-reciprocating bar or rod, D, having an overhanging arm, $D^2$, secured thereto, with a hole or bearing therein for the rammer to slide in, so that the rammer may descend into the shell with the measured force of its own gravity, said rammer being furnished with a shoulder, whereby the weighted rammer is elevated, and also guided into the shell on its descending movement, substantially as specified.

9. In a cartridge-loading machine, the combination, with a shell-carrier having cells, of a discharge-plunger, a reversing cup or device for turning the cartridges end for end, a chute through which the loaded cartridges may descend by their gravity, and a marker or type against which the falling shells impinge, substantially as specified.

10. In a cartridge loading machine, the combination, with a chute or passage through which the loaded shells are discharged and fall by gravity, of a marker below said chute and in the path of the shell, against which the falling shells impinge, substantially as set forth.

11. The combination, in a cartridge-loading machine, with a chute or passage through which the shells may fall, of a marker or type against which the falling shells impinge, and a slotted spring-guard above and at the side of the type, adapted to be depressed by the falling shell, so that the type may strike and mark the same, and to support the shell on its rebound, and thus prevent blurring by a second contact with the type, substantially as specified.

12. In a cartridge-loading machine, the combination of a marker with a movable chute or tube through which the cartridges may fall, situated to receive the cartridge-shells and extending down to the marker, so as to guide the shells down to the marker and permit them to be discharged after being marked, substantially as specified.

13. In a cartridge-loading machine, the combination of a marker with a movable chute or tube situated to receive the cartridge-shells and through which the cartridges may fall, extending down to the marker, so as to guide the shells down to the marker and permit them to be discharged after being marked, and a slotted guard-plate between said chute and marker to prevent blurring by the rebound, substantially as specified.

14. In a cartridge-loading machine, the combination, with a chute or passage situated to receive the cartridge-shells and through which the shells may fall, of a marker or type in the path of said shells and against which the falling shells impinge, and an inking device arranged to supply said marker, substantially as specified.

15. In a cartridge-loading machine, the combination, with a chute or passage situated to receive the cartridge-shells and through which the shells may fall, of a marker or type against which the falling shells impinge, and an inking-ribbon between the chute and type, rollers or pulleys for the ribbon, and mechanism for revolving one or more of the ribbon-rollers, substantially as specified.

16. In a cartridge-loading machine, the combination, with a shell-carrier having cells, of a discharge-plunger, a reversing cup or device beneath said carrier to receive the loaded shells as they are discharged from the carrier and turn them end for end, a chute connecting with said reversing cup or device, through which the loaded cartridges may descend by their gravity, and a marker or type below said chute, against which the falling shells may impinge, and a slotted spring-supported guard-plate at the side of or surrounding said marker to prevent blurring by the rebound, substantially as specified.

17. In a cartridge-loading machine, the combination, with a shell-carrier having cells, of a discharge-plunger, a reversing cup or device beneath said carrier for turning the shells end for end, a chute into which the shells are delivered from said reversing cup or device, through which loaded cartridges may descend by their gravity, and a marker or type below said chute, against which the falling shells may impinge, said chute being provided with a movable lower portion, substantially as specified.

18. In a cartridge-loading machine, the combination, with a shell-carrier having cells, of a discharge-plunger, a reversing cup or device beneath said carrier, a chute into which the shells are delivered from said reversing cup or device, through which loaded cartridges may descend by their gravity, and a marker or type below said chute, against which the falling shells impinge, and an inking device, substantially as specified.

19. In a cartridge-loading machine, the combination, with a shell-carrier having cells, of a discharge-plunger above said carrier, a reversing cup or device beneath said carrier, into which the shells are delivered and by which the shells are turned end for end, a chute into which the shells are delivered from said carrier by said reversing-cup, and through which loaded cartridges may descend by their gravity, and a marker or type below said chute, against which the falling shells impinge, an inking-ribbon above said type, ribbon-pulleys, and mechanism for revolving one of said ribbon-pulleys, substantially as specified.

20. The combination, with an intermittently-revolving shell-carrier, of a revolving crimper and a vertically-movable shell-holding plunger engaging the rim of the shell to force the shell against the revolving crimper and hold it from revolving, substantially as specified.

21. The combination, with an intermittently-revolving shell-carrier, of a revolving crimper, a vertically-movable shell-holding plunger engaging the rim of the shell to force the shell against the revolving crimper, and a lever and cam for operating said shell-holding plunger, substantially as specified.

22. The combination, with a revolving reciprocating crimper, of a reciprocating shell-holding plunger for engaging the rim of the shell, and pivoted lever connecting the two, whereby the crimper and holding-plunger are forced together to clamp the shell between, substantially as specified.

23. The combination, with a revolving reciprocating crimper, of a reciprocating shell-holding plunger to engage the rim of the shell, and pivoted lever connecting the two, whereby the crimper and holding-plunger are forced together to clamp the shell between, and a cam for operating said lever, substantially as specified.

24. The combination, with a revolving crimper, of a shell-holder consisting of a pair of rigid slightly-inclined or wedging jaws adapted to embrace the rim of the shell, and furnished with corrugations extending lengthwise with the jaws, substantially as specified.

25. The combination, with an intermittently-revolving shell-carrier, of a circular track to support the shells, a revolving crimper, and a vertically-movable shell-holding plunger, said track having an opening through which said holding-plunger projects to lift the shell into contact with the crimper, substantially as specified.

26. The combination, with an intermittently-revolving shell-carrier provided with pins $b'$ on its under face, arranged equidistant apart in a circle about the axis of said carrier, of a reciprocating slide, $b^2$, having pivoted pawl $b^3$, and locking projection or stop $b^4$, said pawl and stop engaging said pins on opposite sides of the axis of said carrier, substantially as specified.

27. The combination, with an intermittently-revolving shell-carrier provided with pins $b'$ on its under face, arranged equidistant apart in a circle about the axis of said carrier, of a reciprocating slide, $b^2$, having pivoted pawl $b^3$ and adjustable locking-stop $b^4$, and a cam, $b^7$, for reciprocating said slide, said pawl and stop engaging said pins on opposite sides of the axis of said carrier, substantially as specified.

28. The combination, with an intermittently-revolving shell-carrier, of a wad-feed plate having an opening through which the wads may be pushed into the shell, a pair of wad-holders on opposite sides of said opening, and a pair of oppositely-moving wad-feed slides to feed two wads simultaneously to said opening, one wad above the other, substantially as specified.

29. The combination, with an intermittently-revolving shell-carrier, of a wad-feed plate having an opening through which wads may be pushed into the shell, a pair of wad-holders on opposite sides of said opening, and a pair of oppositely-moving wad-feed slides to feed two wads simultaneously to said opening, one wad above the other, each of said wad-feed slides having a wad-clamping arm or lever to hold and support the wads over said opening, substantially as specified.

30. The combination, with an intermittently-revolving shell-carrier, of a wad-feed plate having an opening through which wads may be pushed into the shell, a pair of wad-holders on opposite sides of said opening, and a pair of oppositely-moving wad-feed slides to feed two wads simultaneously to said opening, one wad above the other, each of said wad-feed slides having a wad-clamping arm or lever to hold and support the wads over said opening, said clamping-arms being provided with springs, and short arms adapted to strike against stop projections to open the same when the wad-feed slides move back under the wad-holders, substantially as specified.

31. The combination, with three or more wad-holders, of three or more wad-feed slides, a common operating lever and cam, and pivoted links connecting all of said feed-slides together or to said lever, whereby they are all operated simultaneously, substantially as specified.

32. The combination, in a cartridge-loading machine, of a wad-holder, with a wad-feed plate, Q, having openings $q$, through which the wad may be pushed into the cartridge, an oscillating wad-feed slide pivoted on the frame of the machine and furnished with a pivoted clamp-arm, a spring for holding said clamp-arm closed, and a stop or projection for opening the same, substantially as specified.

33. In a cartridge-loading machine, the combination, with a revolving shell-carrier, of a powder-hopper and a shot-hopper, a powder-measuring valve, and a shot-measuring valve mounted upon the same oscillating arm or lever, the said lever and a revolving cam engaging and adapted to operate said valve-lever, substantially as specified.

34. In a cartridge-loading machine, the combination, with a revolving shell-carrier, of a powder-hopper and a shot-hopper, a powder-measuring valve and a shot-measuring valve mounted upon the same oscillating arm or lever, said valve oscillating between said powder and shot hoppers and said carrier, and a revolving cam for operating said valve, the chambers in said valves being rectangular and provided with an adjustable side or end, as $o^5$, and adjusting-screws $o^6$, substantially as specified.

35. The combination, in a cartridge-loading machine, of a revolving shell-carrier, a powder-hopper, frame-plate $A^4$ above said carrier, valve-plate $o$, powder-valve O, having measuring-chamber $o^3$, oscillating valve-lever C, for operating said valve, and a cam engaging said lever and connected and operating in conjunction with said carrier, said valve sliding between said plates $A^4$ and $o$ and above said carrier, and said plates having openings for the powder to pass through, substantially as specified.

36. The combination, in a cartridge-loading machine, of a revolving shell-carrier, a powder-hopper, a shot-hopper, frame-plate $A^4$, to which said powder and shot hoppers are secured, valve-plates $o$, secured to the frame of the machine and having discharge-openings $o'$, valve-lever C, measuring-valves O O' for the powder and shot, secured to said valve-lever and oscillating between said frame-plate $A^4$ and valve-plate $o$, cam $o^8$, having projection $o^{10}$, lug $o^9$ on the valve-lever, and link or pawl $o^{11}$, substantially as specified.

37. The combination, with the crimper T, of the crimper-shaft $t$, journaled on arm $t'$, secured to sliding sleeve $t^2$, shaft $d^{10}$ in said sleeve $t^2$, intermeshing gears $t^3$ $t^4$, for revolving said crimper-shaft, sliding shell-holding plunger T', having jaws or lugs $t^5$, lever $T^2$, pivoted to collars $t^6$ $t^7$ on said plunger T', and sleeve $t^2$ and cam $T^3$, for operating said lever, the shell being clamped between said crimper and said shell-holding plunger, all combined and operating substantially as specified.

38. The combination, with the crimper T, of crimper-shaft $t$, journaled on arm $t'$, secured to sliding sleeve $t^2$, shaft $d^{10}$ in said sleeve $t^2$, intermeshing gears $t^3$ $t^4$, for revolving said crimper-shaft, sliding holding-plunger T', having jaws or lugs $t^5$, lever $T^2$, pivoted to collars $t^6$ $t^7$ on said plunger T', sleeve $t^2$, cam $T^3$, for operating said lever, and a spring, $t^8$, to raise the crimper from the shell, all combined and operating substantially as specified.

39. The combination, with the shell-carrier, extractor-plunger, chute, and marker below said chute, of reversing cup or device V between said carrier and chute, reversing-cup shaft $v$, gear $v'$ on said shaft, rack $v^2$, meshing with said gear, hollow reciprocating rack-bar $v^3$, arm $v^5$, sliding rod $v^6$ having pin $v^{11}$, spring $v^7$, and pawl $v^8$, for locking said gear $v'$, all connected together, combined, and operating substantially as specified.

40. The combination, with the shell-carrier, extractor-plunger, chute, and marker below said chute, of reversing cup or device V between said carrier and chute, its shaft $v$, gear $v'$ on said shaft, rack $v^2$, engaging said gear, hollow reciprocating rack-bar $v^3$, arm $v^5$, sliding rod $v^6$, having pin $v^{11}$, spring $v^7$, pawl $v^8$, for locking said gear $v'$, pawl-lever $v^{13}$, pin or projection $v^{14}$ on said rack-bar, and rod $v^{15}$, connected to said pawl-lever $v^{13}$ and to said sliding arm $v^5$, all combined and operating substantially as shown and described, whereby the cup V is reversed and held in its reversed position until the shell is discharged therefrom, substantially as specified.

41. The combination, with a shell-carrier having vertical cells or holes to receive the shells, of a vertically-reciprocating feed-plunger, K, under said carrier, sliding bar D, rack $k$ on said bar D, intermediate gear, $k'$, and rack $k^2$ on said feed-plunger, engaging said gear $k'$, substantially as specified.

42. The combination, with shell-carrier B, having cells $b$, of hollow feed-punch K, sliding pin $k^4$, mounted in said hollow punch, having cam $k^5$, pawl $k^6$, pivoted to said hollow punch, and clutch-operating arm $k^7$, projecting in the path of said pawl $k^6$ when the same is held out by the cam on said sliding pin $k^4$, substantially as specified.

43. The combination, with shell-carrier B, having cells $b$, of hollow feed-punch K, sliding pin $k^4$, mounted in said hollow punch, having cam $k^5$, pawl $k^6$, pivoted to said hollow punch, and clutch-operating arm $k^7$, projecting in the path of said pawl $k^6$ when the same is held out by the cam on said sliding pin $k^4$, clutch operating lever M, clutch lever $m$, spring $m'$, and pivoted link $m^2$, all combined and operating substantially as specified.

44. The combination, in a cartridge-loading machine, of its main power-clutch with a shell-carrier having cells $b$, a hollow feed-punch, K, below the carrier, having a sliding pin, $k^4$, therein to operate the clutch, and a spreading-tool, L, above the carrier and directly opposite said feed-punch to offer resistance to the feed-punch, and thus operate its sliding pin, substantially as specified.

CHRISTIAN C. HILL.

Witnesses:
H. M. MUNDAY,
EDMUND ADCOCK.